Figure 1:
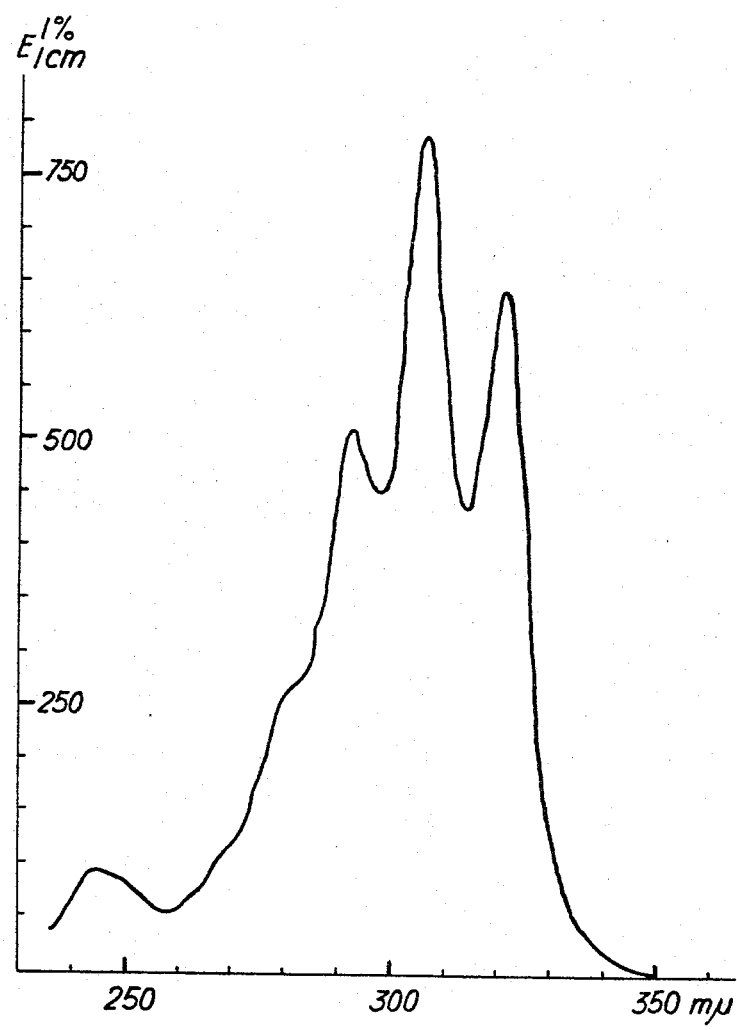

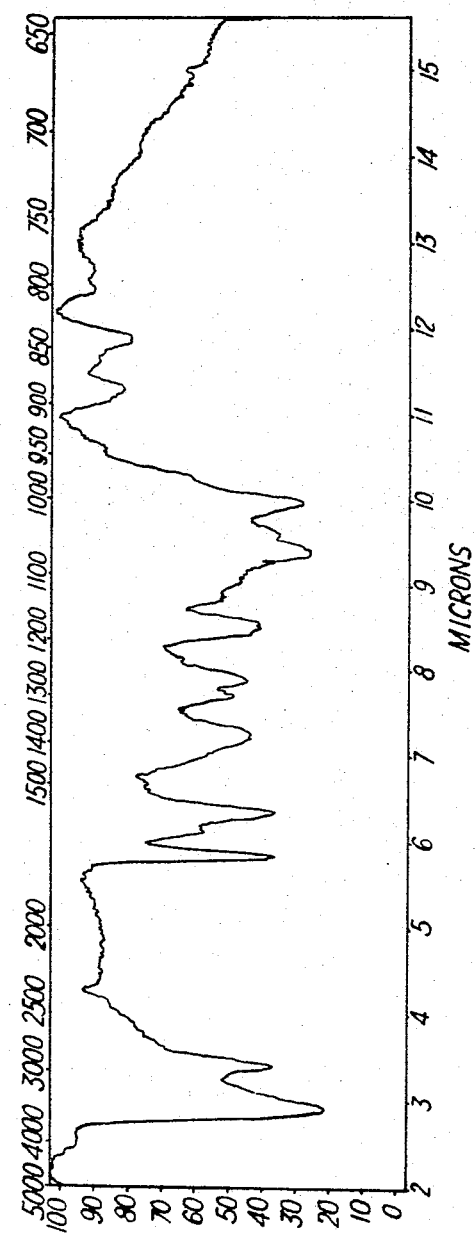

United States Patent Office 3,330,726
Patented July 11, 1967

3,330,726
ANTIFUNGAL ANTIBIOTIC AND METHOD OF PRODUCING SAME
Leon Ninet, Sylvie Pinnert, and Jean Preud'homme, Paris, France, assignors to Rhone-Poulenc S.A., Paris, France, a corporation of France
Filed May 21, 1962, Ser. No. 196,312
Claims priority, application France, May 29, 1961, 863,190; Mar. 30, 1962, 892,873
6 Claims. (Cl. 167—65)

This invention relates to a new antimicrobial product, hereinafter designated 9971 RP. This new product is interesting more particularly on account of its important topical antifungal activity. It has, as noted later herein, valuable therapeutic activity.

According to a first feature of the present invention, therefore, there is provided the new antimicrobial product 9971 RP having the properties and characteristics hereinafter set forth. The new antimicrobial product 9971 RP is produced by the culture, under artificial conditions, of a microorganism, hereinafter identified more completely, belonging to the genus Streptomyces and designated "Streptomyces 40026" or "*Streptomyces gascariensis.*"

Crystalline 9971 RP is soluble in acetic acid, pyridine, dimethylformamide and methanol, very slightly soluble in dioxan, butanol, chloroform and acetone, and practically insoluble in water.

It gives negative results in the following reactions: biuret reaction, Sakaguchi reaction, ferric chloride reaction, Pechman reaction, Tollens reaction, Elson Morgan reaction.

It gives positive results in the following reactions: ninhydrin reaction, Molisch reaction, Millon reaction, Fehling reaction, Oische Boreufreund reaction with bromine in chloroform.

On treatment with concentrated sulphuric or phosphoric acid it gives a fugitive pink colouration, which turns to yellow and then to green and finally to blackish-brown. On treatment with fuming hydrochloric acid it gives a green colouration, which turns to blue.

This antibiotic, which is amphoteric, has the following elemental composition:

C percent=59.30–59.35; H percent=7.55–7.85; O percent=29.30–29.55; N percent=1.90–1.95.

Its physical properties are as follows:

Appearance: white crystalline (needles) powder.
Melting point: decomposes at 265° C.
Optical rotation:
  $[\alpha]_D^{20} = +292°$ (c.=1, pyridine)
  $[\alpha]_D^{20} = +130°$ (c.=1, methanol+N HSl—90:10)
  $[\alpha]_D^{20} = +226°$ (c.=1, methanol+0.1 N NaOH—80:20)
  $[\alpha]_D^{20} = +230°$ (c.=1, dimethylformamide)
  $[\alpha]_D^{20} = 0$ (c.=1, N NaOH).
Neutralisation equivalent: 710 (determined by titration in anhydrous medium with perchloric acid).
Ultra-violet spectrum: (determination carried out on a solution of 1 mg./cc. in dimethylformamide, then diluted to 1/100 with distilled water).

Maximum absorption at 244 m$\mu$ ($E_{1\,cm.}^{1\%}=94$)
  Maximum absorption at 280 m$\mu$ ($E_{1\,cm.}^{1\%}=260$ (shoulder))
  Maximum absorption at 292.5 m$\mu$ ($E_{1\,cm.}^{1\%}=512$)
  Maximum absorption at 306 m$\mu$ ($E_{1\,cm.}^{1\%}=790$)
  Maximum absorption at 321 m$\mu$ ($E_{1\,cm.}^{1\%}=695$)

The ultra-violet spectrum is represented by FIGURE 1 of the accompanying drawings and indicates that the compound has a tetra-ene structure. Nevertheless, the compound is certainly different from known antimicrobial products which have a polyene structure.

Infra-red spectrum: (determination carried out on tablets of a mixture with KBr).

This spectrum is represented by FIGURE 2 of the accompanying drawings in which the lower scale of the abscissae represents wave-lengths expressed in microns and the upper scale of the abscissae represents the wave-numbers in cm.$^{-1}$, and the ordinates represent the percentage transmissions.

The principal infra-red absorption bands of the compound 9971 RP are listed in the following Table I:

TABLE I

| 3410 vs | 1229 vw | 943 vw |
|---|---|---|
| 2930 s | 1176 s | 885 m |
| 1713 s | 1130 sh | 860 vw |
| 1632 m | 1107 sh | 842 m |
| 1578 s | 1066 vw | 803 w |
| 1380 s | 1043 m (sh) | 790 w |
| 1298 m | 1004 vs | 740 vw |
| 1269 s | 976 sh | 712 vw | vs=very strong
s=strong
m=medium
w=weak
vw=very weak
sh=shoulder.

The organism from which 9971 RP is produced belongs to the genus Streptomyces and is designated "Streptomyces 40026." A sample of it has been deposited at the Northern Regional Research Laboratory, Peoria, Illinois (U.S.A.) under the registration number NRRL 2955. This organism was isolated from a soil sample taken near Corrientes in Argentina from a fallow piece of ground. The method of isolation was as follows: the sample of soil was suspended in sterile distilled water and the suspension then diluted to various concentrations. A small quantity from each dilution was spread on the surface of Petri dishes containing Emerson's nutritive medium or other appropriate medium. After incubation for several days at 26° C., the colonies of micro-organisms are pricked out onto agar slopes in order to give more abundant cultures.

Following the classification of "Bergey's Manual of Determinative Bacteriology," 7th edition (1957), for the genus Streptomyces, no species description has been found in which the culture characteristics and biochemical properties coincides with those of Streptomyces 40026. For this reason, this organism can be considered to be a new species. The name "*Streptomyces gascariensis*" has been given to this species by reason of its origin. The following is a description of its characteristics:

MICROSCOPIC MORPHOLOGY

Cultures on thin plates of a synthetic medium based on starch and mineral salts [Grundy et coll. Antibiotics and Chemotherapy 1, 309 (1951)], examined under the microscope show the formation of branched mycelial filaments as well as spore chains characteristic of the genus Streptomyces. The mycelial filaments carry very numerous spore chains; the spore-bearing filaments have pronounced undulations but are not spirals. The spores are slightly oval (almost spherical) about 1$\mu$ wide and 1.2$\mu$ long. The mycelial filaments are about 1$\mu$ wide.

GENERAL CHARACTERISTICS

On those media described as "synthetic," *S. gascariensis* presents, in general, a colourless vegetative mycelium and does not produce soluble pigment. Upon "organic" media it forms a colourless or dark brown vegetative mycelium and soluble pigments of a brown colour which is more or less intense according to the medium and the age of the culture. The aerial mycelium does not appear on all media. When it is produced, it is always white at the commencement of its development, then becoming brownish-pink or medium brown.

FORM OF ISOLATED COLONIES (a) In a synthetic medium based upon starch and mineral salts, mono-spore cultures on Petri dishes form round colonies which are flat and very slightly raised at the centre; the edges are regular; the colonies sink into the agar. The vegetative mycelium is smooth, generally forming concentric rings of poorly defined profile, and is colourless. The aerial mycelium takes the form of concentric rings; at first white, it changes with the degree of development to become pink, then brown. It does not form soluble pigment in the agar.

(b) On media based upon maltose and tryptone (A. M. Williams, E. McCoy, App. Microbiology 1, 307, 1953), the colonies are round with irregular, lobed edges, occasionally straightening to form a circular border; the colonies are rather convex at the centre. The vegetative medium has a strongly folded surface, rolling up into chips with old age; it is grey-brown in colour. The aerial mycelium is at first white, becoming pink and finally brown with age; it is covered with numerous droplets of colourless exudate. An intensely brown soluble pigment diffuses through the agar.

CULTURE CHARACTERISTICS AND BIOCHEMICAL PROPERTIES

The culture characteristics and biochemical properties of *Streptomyces gascariensis* have been examined on nutritive agars and in the nutritive broths usually used to identify strains of Streptomyces. The observations made are recorded in Table II and relate to cultures incubated at 26° C. for one month. The majority of the culture media used were prepared according to the formulae contained in "The Actinomycetes" by S. A. Waksman, p. 193–197, Chronica Botanica Company, Waltham (Mass.), U.S.A., 1950; in this case they are identified by the number given to them in "The Antinomycetes." The media designated by letters were prepared according to the following references or formulae:

A: K. L. Jones, J. Bacteriology 57, 142 (1949).

B: Grundy et coll. Antibiotics and Chemotherapy 1, 309 (1951).

C: A. M. Williams, E. McCoy, App. Microbiology 1, 307 (1953).

D: obtained by replacing the sucrose of the formula given by Waksman for "Czapek's synthetic sucrose agar" (1) by 3% glucose.

E: calcium malate 1%; $NH_4Cl$ 0.05%; $K_2HPO_4$ 0.05%; agar 2%.

F: peptone 0.5%; meat extract 0.3%; tyrosine 0.5%; agar 2%.

G: "plain gelatin" prepared according to the instructions given in the "Manual of Methods for Pure Culture Study of Bacteria" of the Society of American Bacteriologists ($II_{50}$—18).

H: according to the formula given in the "Manual of Methods for Pure Culture Study of Bacteria" of the Society of American Bacteriologists ($II_{50}$—18).

J: prepared with Gayelord Hauser-brand skimmed-milk powder according to the instructions for preparation.

TABLE II

| Culture Medium | Degree of Development | Vegetative Mycelium | Aerial Mycelium | Soluble Pigment | Biochemical Properties |
| --- | --- | --- | --- | --- | --- |
| Bennett's Agar (ref. A) | Good | Slightly folded, colourless. | Medium brown | Light brown | |
| Glycerine-Asparagine Agar (3). | do | Flat, lobed edges, colourless to cream. | do | | |
| Snythetic Agar (Starch-mineral salts) (ref. B). | do | Flat, colourless | Light brown | | |
| Maltose-tryptone Agar (ref. C). | do | Folded, dark grey-brown, nearly black. | Brownish-pink becoming medium brown. | Brown, very abundant. | |
| Synthetic Agar (Czapek's medium) (1). | Moderate | Flat, efflorescent, colourless. | White, light brown at edges. | | |
| Synthetic Agar with Glucose (D). | do | Flat, colourless | Traces | | |
| Agar with Glucose (7) | Good | Folded, colourless | White, becoming pink then brown. | | Formation of crystals in the agar. |
| Starch Agar (10) | Weak | Sunk in agar, colourless. | White | | |
| Calcium Malate Agar (E) | do | Flat, colourless | Absent | | Moderate solubilisation of the calcium malate. |
| Tyrosine Agar (ref. F) | Moderate | Slightly folded | Greyish | Brown, abundant | No solubilisation of the tyrosine. |
| Nutritive Agar (5) | do | Brown | | Light brown | |
| 12% Pure Gelatine (Stab Culture) (G). | Good | Folded on surface | White | Yellow brown | Infundibuliform liquefaction. |
| Potato (27) | Vigorous | Wrinkled, irregular | Cream-white to pale brownish-pink. | Brownish grey | |
| Starch solution (19) | Good | Incomplete pellicle at the surface and flakes at the bottom of the tube. | | | Delayed hydrolysis stopping at dextrin stage. |
| Nitrated Nutritive Broth (H). | Weak | Small granular flakes developing mainly on the surface. | | | Nitrites reaction positive. |
| Skimmed Milk (ref. J) | Good | At the surface, very folded ring and pellicle. | | Brown | Peptonisation without coagulation. Final pH 7.7. |

Utilisation of various hydrocarbon substances [according to the method of T. G. Pridham and D. Gottlieb, J. Bact. 56, 167 (1948)].

The cultures are carried out on agar slopes. Incubation is at 26° C. Amongst substances producing a rapid and complete growth with the formation of aerial mycelium and spores in three weeks are: glucose, fructose, galactose, maltose, mannose, arabinose, lactose, xylose, dextrin, starch and glycerol. Ribose gives rise to a less good growth.

Rhamnose, sorbose, sucrose raffinate, inulin, erythritol, adonitol, dulcitol, sorbitol and inositol do not allow development or give rise only to an extremely restricted development. It is therefore possible to say that these substances are not utilised.

CLASSIFICATION OF STREPTOMYCES 40026

The different characteristics listed above approach those of *Streptomyces cylindrosporus* Krassilnikov (1941). Nevertheless, Streptomyces 40026 is not identical with it since several differences may be observed; in particular the colour of the spores of *S. cylindrosporus* is described as light grey or dark grey according to the media, while Streptomyces 40026 has spores the colour of which varies from brownish-grey to brown and light brown.

According to a further feature of the present invention, there is provided a process for the preparation of the antimicrobial product herein designated 9971 RP which comprises cultivating Streptomyces 40026 or a mutant thereof on a nutrient medium and separating the antimicrobial product formed during the course of the culture.

The culture of Streptomyces 40026 may be carried out by all methods of aerobic surface or submerged culture but the latter is to be preferred for reasons of convenience. The various types of apparatus which are currently in use in the fermentation industry may be used for this purpose.

In particular, the following sequence of operations may be adopted:

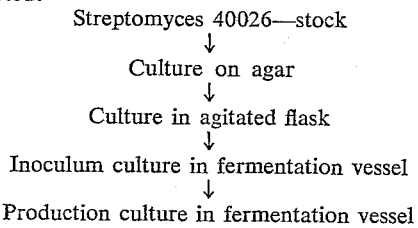

Streptomyces 40026—stock
↓
Culture on agar
↓
Culture in agitated flask
↓
Inoculum culture in fermentation vessel
↓
Production culture in fermentation vessel The fermentation medium should contain essentially an assimilable source of carbon and an assimilable source of nitrogen, inorganic substances and, optionally, growth-promoting factors. All these substances may be introduced in the form of well-defined products or as complex mixtures such as are found in biological products of diverse origins.

As assimilable sources of carbon, carbohydrates may be utilised, such as glucose, sucrose, lactose, dextrins, starch and molasses, or other carbon, hydrogen and oxygen containing substances, such as the sugar alcohols, e.g. glycerol and mannitol, or organic acids such as lactic acid, citric acid and tartaric acid. Animal or vegetable oils such as lard or soya oil may, with advantage, replace these various carbon, hydrogen and oxygen containing substances or be used together with them. The suitable sources of assimilable nitrogen are extremely varied. They may be very simple chemical substances such as nitrates, inorganic and organic ammonium salts, urea or amino acids. They may also be introduced in the form of complex substances containing nitrogen principally in the form of protein, e.g. casein, lactalbumin and gluten and their hydrolysates, soya, peanut, and fish meal, meat extracts, yeast, "Distiller's solubles" and corn-steep.

Of the inorganic substances added, some may have a buffering or neutralising effect such as alkali metal and alkaline earth phosphates or calcium and magnesium carbonates.

Others produce the ionic equilibrium necessary for the development of Streptomyces 40026 and the production of the desired product, such as alkali metal and alkaline earth chlorides and sulphates. In addition, some behave more especially as activators of metabolic reactions of Streptomyces 40026: these are the salts of zinc, cobalt, iron, copper and manganese.

The pH of the fermentation medium at the commencement of the culture is preferably between 6.0 and 7.8. The optimal temperature for the fermentation is 25–27° C. but a satisfactory production is obtained at temperatures between 23° and 35° C. The aeration of the fermentation may be varied between fairly wide values. It has, nevertheless, been found that an aeration rate of 0.3 to 2 litres of air per litre of broth per minute gives particularly good results. The maximum yield of the desired product is obtained after 2 to 5 days of culture, the time depending essentially upon the medium used.

From the foregoing statements, it will be seen that the general conditions for the culture of Streptomyces 40026 for the production of the desired product may be varied to a fairly wide degree and adapted to each particular circumstance.

The compound 9971 RP may be isolated from the fermentation cultures by different methods. The fermentation culture may be filtered at any pH but an important part of the activity remains in the filter-cake which must also be treated to extract the active product. Nevertheless, at a neutral or alkaline pH, and particularly at a pH between 7 and 10, the percentage of activity retained by the mycelium is at its lowest. Whatever may be the pH value at filtration, the activity which remains in the filter-cake can be extracted with a solvent which is an alkanol, such as methanol, ethanol, the propanols or the butanols. Further, the compound may be extracted from the filtered culture by means of a water-immiscible organic solvent such as an alkanol containing four or five carbon atoms.

The crude fermentation culture may also be extracted with such a solvent. In this case, all activity passes into the organic phase, which is separated from the aqueous phase by filtration or centrifuging. The crude product may be isolated from the organic solutions indicated above by the concentration of that solution to a small volume. Alternatively, it may be preferable to stop the concentration earlier: then the addition of water at pH 7 and of a poor solvent for 9971 RP, such as petroleum ether, cyclohexane or diisopropyl ether, causes the precipitation of the crude product.

The crude product may be purified by a process which consists of three successive, different stages, each one of which may be repeated several times according to production requirements, in order to obtain 9971 RP in a form suitable for the applications envisaged.

The first purification stage consists of dissolving the crude product, isolated from the fermentation cultures, in slightly alkaline water, preferably at a pH between 8 and 9. The aqueous solution thus obtained is acidified, preferably to a pH of about 4, and the product is then extracted with a chlorinated organic solvent for the product containing a water-immiscible alkanol. This extraction may be carried out particularly advantageously by using chloroform containing 5% of butanol.

The organic phase thus obtained is then concentrated under reduced pressure to remove completely the chlorinated organic solvent. The purified 9971 RP may then be isolated in crystalline form from its alcoholic solution, either directly in a single crop by the addition of a mixture of acetone and water, or in two successive crops by allowing the alcoholic solution first to stand for 12 to 48 hours, preferably at a temperature between 30 and 40° C., which causes the crystallisation of a first fraction, followed by treatment of the mother liquors with a mixture of acetone and water, which produces the crystallisation of a second fraction.

The second purification stage consists of dissolving the purified crystals obtained above in a mixture of chlorinated solvent for the product and phenol in which the proportion by volume is about 4 to 1. The solution thus obtained is treated with a water-immiscible alkanol and then concentrated under reduced pressure to remove completely the chlorinated solvent. A mixture of acetone and water is then added and the solution obtained allowed to stand for 12 to 48 hours, preferably at a temperature between 30 and 40° C. The purified 9971 RP crystallises and is isolated directly, optionally after washing with dimethylsulphoxide to obtain a complete decolouration.

The third stage of purification consists of suspending the purified crystals obtained above in alkaline water, preferably at a pH between 10 and 11. The suspension thus obtained is agitated at ambient temperature for 1 to 4 hours. After this operation, the 9971 RP, a part of which has gone into solution, recrystallises spontaneously, changing its crystalline form. The pH of the solution is then taken to about 7 and, after ripening for 30 minutes to 1 hour, the crystals are separated. Pure crystalline 9971 RP is thus obtained.

The compound 9971 RP has been found to be active in vitro against a large number of filamentary and yeast-like fungi, in particular against *Pestalozzia palmarum*, *Saccharomyces pastorianus*, *Stemphylium radicinum*,

*Aspergillus niger, Candida albicans, Botrytis cinerea, Mucor corymbifer, Rhizopus nigricans, Alternaria tenuis, Trichothecium roseum, Fusarium culmorum, Penicillium ansari mofidi* and *Penicillium chrysogenum*.

The toxicity of the compound has been studied principally in the mouse. The 50% lethal dose, i.e. the dose which kills 50% of the animals ($LD_{50}$) is greater than 1 g./kg. when the product is administered orally.

Of low toxicity in the mouse, this product is a suitable therapeutic agent for the local treatment of mycoses in animals. It may also be incorporated as a protector in preparations which are susceptible to moulds.

The following examples will serve to illustrate the invention. In these examples, activity is determined by a diffusion method with *Pestalozzia palmarum* as the sensitive organism and in comparison with a pure crystalline sample of the product as standard. This activity is, therefore, expressed in micrograms ($\mu$g.) of standard crystalline product per mg. for solid products and in $\mu$g. of standard crystalline product per cc. for solutions.

Example I

A 170 litre fermentation vessel is charged with:

| | |
|---|---|
| Corn steep (50% dry extract) _____kg__ | 2.400 |
| Sucrose _____kg__ | 3.600 |
| Calcium carbonate _____kg__ | 0.900 |
| Ammonium sulphate _____kg__ | 0.240 |

Tap water to make 100 litres.

This culture medium has a pH of 6.0.

The culture medium is sterilised by the passage of steam at 122° C. for 40 minutes. After sterilisation and cooling to 27° C., the final volume of the broth is 120 litres and the pH 7.05. The medium is then seeded with 250 cc. of a culture, in an agitated Erlenmeyer flask, of the strain Streptomyces 40026.

The culture in the fermentation vessel is aerated with sterile air at a rate of 5 m.³/hour and stirred with a rotary stirrer at 350 r.p.m. The temperature is maintained at 27° C. The pH of the medium remains at its initial value (7.05) for 10 hours and then slowly falls to 6.9 before rising more rapidly to 7.5. The development of the mycelium corresponnds to this fall in pH and the culture is suitable for seeding the production culture 23 hours after seeding.

The productive culture is carried out in a 350 litre fermentation vessel charged with the following substances:

| | |
|---|---|
| Yeast extract _____kg__ | 2 |
| "Distiller's solubles" _____kg__ | 10 |
| Sodium hydroxide solution ($d=1.33$) ____cc__ | 950 |

Tap water to make 125 litres.

The medium is sterilised by the passage of steam at 122° C. for 40 minutes. After sterilisation, and cooling to 25° C., the volume of the broth is 150 litres. A sterile aqueous solution (50 litres) containing hydrated glucose (10 kg.) is then added. The final volume of the broth is 200 litres and the pH 6.85. The medium is then seeded with 20 litres of the preceding culture prepared in the 170 litre fermentation vessel. The medium is stirred with a helix turning at 545 r.p.m., aerated with 10 m.³/hour of sterile air and maintained at 25° C.

The pH falls slowly over 40 hours to 5.70, remains stable for 20 hours and then rises to reach 6.95 after 95 hours of culture. When the pH reaches 5.70 production of the product commences. The maximum production is attained at 6.5 during the rise of the pH. The fermentation is halted after 95 hours and the activity of the medium is then 410 $\mu$g./cc.

This fermentation culture (190 litres) is transferred to a vessel fitted with a stirrer and is stirred for one hour with n-butanol (115 litres) while the pH is adjusted to 3.5 with dilute hydrochloric acid. A filtration adjuvant (12 kg.) is then added. The mixture is filtered on a filter-press and the cake washed with water (50 litres). The organic phase is separated and then washed with water (11 litres). The organic layer is again separated and then concentrated under reduced pressure to ⅟₂₀ of the initial volume of the culture, or 9.5 litres. The concentrate is treated with hexane (28.5 litres) and extracted with water (2× 14.25 litres) while the pH is adjusted to 7 by means of dilute sodium hydroxide solution. The combined aqueous extracts are concentrated under reduced pressure to half their volume and then extracted in their turn with n-butanol (2× 9.5 litres) at pH 3. The combined butanolic extracts are concentrated under reduced pressure to 1.4 litres and the product is precipitated by the addition of petroleum ether (11.2 litres). The precipitate is separated, washed and dried, giving a crude product (115 g.) having an activity of 325 $\mu$g./mg.

Example II

A 350 litre fermentation vessel is charged with the following substances:

| | |
|---|---|
| Corn steep (50% dry extract) _____kg__ | 2 |
| "Distillers' solubles" _____kg__ | 10 |
| Sodium hydroxide solution ($d=1.33$) ____litres__ | 1.2 |

Tap water to make 125 litres.

The medium is sterilised by the passage of steam at 122° C. for 40 minutes, cooled at 25° C. and a sterile aqueous solution (50 litres) containing hydrated glucose (10 kg.) added. The pH is 6.95. The medium is then seeded with 20 litres of the culture from the 170 litre fermentation vessel of Example I. The medium is stirred with a helix turning at 440 r.p.m., aerated with 10 m.³/hour of sterile air and maintained at 25° C.

The pH fluctuates as in Example I. The fermentation is halted when the pH, during the course of its rise, reaches 6.5, i.e. after 69 hours. The activity of the medium is then 500 $\mu$g./cc.

The extraction of the product is then carried out as described in Example I.

Example III

Crude product (515 g.) having an activity of 370 $\mu$g./mg., obtained as described in Example I, is dissolved in water (8 litres) make alkaline to pH 9. The aqueous solution obtained is acidified to pH 4 and then extracted twice with a chloroform-butanol mixture (95:5 by volume; 8 litres and 2 litres). The organic phases are combined and concentrated under reduced pressure at a temperature below 40° C. to 2.5 litres. Distillation is then contained at constant volume, butanol being added, until the chloroform is completely eliminated. The solution obtained is then treated with an acetone-water mixture (90:10 by volume; 2.5 litres) and allowed to stand for 20 hours at 37° C. The crystals formed are separated, washed by stirring with a butanol-acetone mixture (50:50 by volume; 0.5 litre), followed by acetone (0.5 litre) and finally dried for 12 hours at 40° C./2 mm. Hg, giving brownish crystals (150 g.) having an activity of 640 $\mu$g./mg.

These crystals are dissolved in a chloroform-phenol mixture (80:20 by volume; 1.5 litres) and the solution obtained is filtered in the presence of a filtration adjuvant. The filtrate is treated with butanol (1.5 litres) and then concentrated to 1.1 litres under reduced pressure at a temperature below 40° C. An acetone-water mixture (98:2 by volume; 6 litres) is then added with stirring and the solution obtained is filtered first in the presence of a filtration adjuvant and then through a porous plate of sintered glass. The solution obtained is allowed to stand for 20 hours at 37° C. The crystals formed are separated, washed successively with acetone (0.5 litre), a butanol-dimethylsulphoxide mixture (50:50 by volume; 0.5 litre) and acetone (0.7 litre), and finally dried for 12 hours at 40° C./2 mm. Hg, giving white crystals (65 g.) having an activity of 903 $\mu$g./mg. By combining the mother-liquors and the preceding washings, there is obtained, after standing for 48 hours at 37° C., a second crop (68 g.) having an activity of 475 μg./mg.

Crystals (48 g.), titrating 903 μg./mg. obtained above, are suspended in water (1 litre). This suspension is adjusted to pH 10.4 with N sodium hydroxide solution (40 cc.) and then stirred for 3 hours at ambient temperature. Microscopic examination shows then that the change in crystalline form has ceased. The pH is then taken to 7.3 by the slow addition of N hydrochloric acid and the suspension stirred for one hour at ambient temperature. The crystals obtained are separated, washed with water (250 cc.), followed by acetone (500 cc.) and dried, giving pure 9971 RP (42 g.) in the form of white needles having an activity of 1,000 μg./mg.

We claim:
1. The fungicidal product which has a melting point of 265° C. with decomposition, which possesses an optical rotation $[\alpha]_D^{20}$ of +292° (c.=1, pyridine), which is soluble in pyridine, dimethylformamide, acetic acid and methanol, slightly soluble in butanol, acetone, benzene and dioxan and practically insoluble in water, which is amphoteric, which has the elemental analysis C=59.30–59.35%, H=7.55–7.85%, O=29.30–29.55% and N=1.90–1.95%, which in its ultra-violet spectrum has four principal absorption maxima at

244 mμ ($E_{1cm.}^{1\%}$=94), 292.5 mμ ($E_{1cm.}^{1\%}$=512), 306 mμ ($E_{1cm.}^{1\%}$=790) and 321 mμ ($E_{1cm.}^{1\%}$=695)

and which has the following principal absorption bands in its infra-red spectrum: 3410 (very strong), 2930 (strong), 1713 (strong), 1632 (medium), 1578 (strong), 1380 (strong), 1298 (medium), 1269 (strong), 1229 (very weak), 1176 (strong), 1130 (shoulder), 1107 (shoulder), 1066 (very weak), 1043 (medium, shoulder), 1004 (very strong), 976 (shoulder), 943 (very weak), 885 (medium), 860 (very weak), 842 (medium), 803 (weak), 790 (weak), 740 (very weak) and 712 (very weak).

2. A process for the production of a fungicidal product, which comprises cultivating Streptomyces 40026 on a nutrient medium containing assimilable sources of carbon and an assimilable source of nitrogen and inorganic substances under submerged aerobic conditions at a pH between 6.0 and 7.8 and at a temperature of 23–35° C., with an aeration rate of 0.5–2 litres of air per litre of culture broth per minute for a period of 2–5 days, and separating the fungicidal product from the culture medium by extraction with an organic solvent for said product.

3. A process according to claim 2, wherein the separated fungicidal product is purified by dissolving it in an alkaline aqueous medium, acidifying the medium, extracting the product by means of a mixture of a chlorinated organic solvent for the product and a water-immiscible alkanol, concentrating the organic extract by removal of the chlorinated organic solvent and crystallising the product from the resulting alcoholic solution, dissolving the resulting crystals in a mixture of chlorinated organic solvent for the product and phenol, adding a water-immiscible alkanol, concentrating the solution by removal of the chlorinated organic solvent and crystallising the product from the resulting alcoholic-phenolic solution, suspending the resulting crystalline product in an alkaline aqueous medium, acidifying the medium and separating the crystals obtained.

4. A process according to claim 2, wherein the temperature of the culture is maintained at 25° to 27° C.

5. A process for inhibiting fungal growth which comprises applying to fungi a fungicidal product which has a melting point of 265° C. with decomposition, which possesses an optical rotation $[\alpha]_D^{20}$ of +292° (c.=1, pyridine), which is soluble in pyridine, dimethylformamide, acetic acid and methanol, slightly soluble in butanol acetone, benzene and dioxan and practically insoluble in water, which is amphoteric, which has the elemental analysis C=59.30–59.35%, H=7.55–7.85%, O=29.30–29.55% and N=1.90–1.95%, which in its ultra-violet spectrum has four principal absorption maxima at 244 mμ ($E_{1cm.}^{1\%}$=94), 292.5 mμ ($E_{1cm.}^{1\%}$=512), 306 mμ ($E_{1cm.}^{1\%}$=790) and 321 mμ ($E_{1cm.}^{1\%}$=695)

and which has the following principal absorption bands in its infra-red spectrum: 3410 (very strong), 2930 (strong), 1713 (strong), 1632 (medium), 1578 (strong), 1380 (strong), 1298 (medium), 1269 (strong), 1229 (very weak), 1176 (strong), 1130 (shoulder), 1107 (shoulder), 1066 (very weak), 1043 (medium, shoulder), 1004 (very strong), 976 (shoulder), 943 (very weak), 885 (medium), 860 (very weak), 842 (medium), 803 (weak), 790 (weak), 740 (very weak) and 712 (very weak).

6. A method for the treatment of an animal having a mycosis which comprises administering topically to the animal in an amount sufficient to relieve said mycosis a fungicidal product which has melting point 265° C. with decomposition, which possesses an optical rotation $[\alpha]_D^{20}$ of +292° (c.=1, pyridine), which is soluble in pyridine, dimethylformamide, acetic acid and methanol, slightly soluble in butanol, acetone, benzene and dioxan and practically insoluble in water, which is amphoteric, which has the elemental analysis C=59.30–59.35%, H=7.55–7.85%, O=29.30–29.55% and N=1.90–1.95%, which in its ultra-violet spectrum has four principal absorption maxima at 244 mμ ($E_{1cm.}^{1\%}$=94), 292.5 mμ ($E_{1cm.}^{1\%}$=512), 306 mμ ($E_{1cm.}^{1\%}$=790) and 321 mμ ($E_{1cm.}^{1\%}$=695)

and which has the following principal absorption bands in its infra-red spectrum: 3410 (very strong), 2930 (strong), 1713 (strong), 1632 (medium), 1578 (strong), 1380 (strong), 1298 (medium), 1269 (strong), 1229 (very weak), 1176 (strong), 1130 (shoulder), 1107 (shoulder), 1066 (very weak), 1043 (medium, shoulder), 1004 (very strong), 976 (shoulder), 943 (very weak), 885 (medium), 860 (very weak), 842 (medium), 803 (weak), 790 (weak), 740 (very weak) and 712 (very weak).

No references cited.

ALBERT T. MEYERS, *Primary Examiner.*

S. ROSEN, *Assistant Examiner.*